United States Patent
Lu et al.

(10) Patent No.: US 11,450,016 B1
(45) Date of Patent: Sep. 20, 2022

(54) NEARSHORE REAL-TIME POSITIONING AND MAPPING METHOD FOR UNMANNED SURFACE VEHICLE WITH MULTIPLE DISTANCE MEASURING SENSORS

(71) Applicant: Guangdong University of Technology, Guangzhou (CN)

(72) Inventors: Renquan Lu, Guangzhou (CN); Yong Xu, Guangzhou (CN); Zijie Chen, Guangzhou (CN); Ming Lin, Guangzhou (CN); Hongxia Rao, Guangzhou (CN)

(73) Assignee: GUANGDONG UNIVERSITY OF TECHNOLOGY, Guangzhou (CN)

( * ) Notice: Subject to any disclaimer, the term of this patent is extended or adjusted under 35 U.S.C. 154(b) by 0 days.

(21) Appl. No.: 17/584,598

(22) Filed: Jan. 26, 2022

(30) Foreign Application Priority Data

Jun. 16, 2021 (CN) .......................... 202110668955.4

(51) Int. Cl.
| | |
|---|---|
| *G06T 7/521* | (2017.01) |
| *G01S 7/48* | (2006.01) |
| *G01S 17/86* | (2020.01) |
| *G06T 7/73* | (2017.01) |
| *G01S 17/89* | (2020.01) |

(52) U.S. Cl.
CPC ............ *G06T 7/521* (2017.01); *G01S 7/4808* (2013.01); *G01S 17/86* (2020.01); *G01S 17/89* (2013.01); *G06T 7/73* (2017.01); *G06T 2207/10028* (2013.01); *G06T 2207/30252* (2013.01)

(58) Field of Classification Search
USPC .......................................................... 701/445
See application file for complete search history.

(56) References Cited

FOREIGN PATENT DOCUMENTS

CN    216070513 U  *  3/2022

OTHER PUBLICATIONS

CN 202110668955.4—Notification of Granting Patent Right to the Invention, dated Nov. 24, 2021, 3 pages, (with English translation).

* cited by examiner

*Primary Examiner* — Tyler D Paige
(74) *Attorney, Agent, or Firm* — Getech Law LLC; Jun Ye (57) ABSTRACT

A nearshore real-time positioning and mapping method for an unmanned surface vehicle with multiple distance measuring sensors comprises: acquiring predicted gesture data of the unmanned surface vehicle by an inertia measurement unit; acquiring radar point cloud data by a laser radar, projecting the radar point cloud data to a depth map, and reserving ground points and break points on the depth map; dividing the depth map into six sub depth maps, obtaining a feature point set via a curvature of each laser point, and converting all the feature point sets of the laser radar into coordinates of the unmanned surface vehicle; obtaining a relative gesture transformation matrix of the current unmanned surface vehicle via the radar cloud point data of two adjacent frames; accruing multiple factors, and optimizing a gesture of the unmanned surface vehicle in form of a factor pattern; and constructing a three-dimensional cloud point pattern.

7 Claims, 2 Drawing Sheets

NEARSHORE REAL-TIME POSITIONING AND MAPPING METHOD FOR UNMANNED SURFACE VEHICLE WITH MULTIPLE DISTANCE MEASURING SENSORS

TECHNICAL FIELD

The present invention relates to the technical field of unmanned surface vehicles, in particular to a nearshore real-time positioning and mapping method for an unmanned surface vehicle with multiple distance measuring sensors.

BACKGROUND

At present, most surveying and mapping unmanned surface vehicles in the market adopt schemes of positioning by an inertial navigation system plus mapping by laser radar or positioning by the inertial navigation system plus sonar mapping. When the unmanned surface vehicle positioned based on the inertial navigation system passes bridge openings or some areas with some shelters, imprecision of surveying and mapping is caused as errors are generated in gesture estimation of the unmanned surface vehicle as a result of instable signals of the inertial navigation system.

In addition, at present, there are still many unsolved problems in multisensor fusion positioning. How to carry out centimetre-level positioning by using a plurality of laser radar on the unmanned surface vehicle and to establish a three-dimensional point cloud map by using a plurality of sonar is a hot top in multisensory fusion positioning of the unmanned surface vehicle.

SUMMARY

Aiming at the above-mentioned defects, the objective of the present invention is to provide a nearshore real-time positioning and mapping method for an unmanned surface vehicle with multiple distance measuring sensors.

In order to achieve the objective, the present invention adopts a technical scheme as follows:

A nearshore real-time positioning and mapping method for an unmanned surface vehicle with multiple distance measuring sensors includes the following steps:

Step A, acquiring predicted gesture data of the unmanned surface vehicle by an inertia measurement unit;

Step B, acquiring radar point cloud data by a laser radar, projecting the radar point cloud data to a depth map, and reserving ground points and break points on the depth map;

Step C, dividing the depth map into six sub depth maps, obtaining a feature point set via a curvature of each laser point, and converting all the feature point sets of the laser radar into coordinates of the unmanned surface vehicle;

Step D, obtaining a relative gesture transformation matrix of the current unmanned surface vehicle via the radar cloud point data of two adjacent frames;

Step E, acquiring a laser radar speedometer factor, an inertial measurement unit factor, a Doppler velocimeter factor, a Beidou satellite positioning factor and a closed loop factor, and optimizing a gesture of the unmanned surface vehicle in form of a factor pattern; and Step F, constructing a three-dimensional cloud point pattern via each laser radar point cloud data, each sonar point cloud data and the gesture of the unmanned surface vehicle.

In an embodiment, the Step A specifically includes:

obtaining a predicted gesture of the unmanned surface vehicle by the inertial measurement unit via four-order Runge-Kutta pre-integration according to an angular velocity $\hat{w}_t$ and an angular acceleration $\hat{a}_t$ at the current moment, wherein the predicted gesture of the unmanned surface vehicle comprises relative rotation $$_{b_{t-1}}^{b_t}q,$$

relative displacement $_{b_{t-1}}^{b_t}p$, velocities $V_t$, angular velocimeter deviations $b_{g,t}$ and angular accelerometer deviations $b_{a,t}$ of a current frame and a previous frame;

a four-order Runge-Kutta pre-integration of relative rotation $$_{b_{t-1}}^{b_t}q$$

is:

$$_{b_{t-1}}^{b_t}q = q_0 + \frac{1}{6}\Delta t(k_1^q + 2k_2^q + 2k_3^q + k_4^q),$$

wherein value ranges of $k_1^q$, $k_2^q$, $k_3^q$, $k_4^q$ are as follows:

$$\begin{cases} k_1^q = \frac{1}{2}\Omega(\hat{\omega}_t)q_0 \\ k_2^q = \frac{1}{2}\Omega(\hat{\omega}_t)\left\|q_0 + \frac{1}{2}k_1^q\Delta t\right\|_{norm} \\ k_3^q = \frac{1}{2}\Omega(\hat{\omega}_t)\left\|q_0 + \frac{1}{2}k_2^q\Delta t\right\|_{norm} \\ k_4^q = \frac{1}{2}\Omega(\hat{\omega}_t)\|q_0 + k_3^q\Delta t\|_{norm} \end{cases}, \Omega(\hat{\omega}_t) = \begin{bmatrix} 0 & -\hat{\omega}_x & -\hat{\omega}_y & -\hat{\omega}_z \\ \hat{\omega}_x & 0 & \hat{\omega}_z & -\hat{\omega}_y \\ \hat{\omega}_y & -\hat{\omega}_z & 0 & \hat{\omega}_x \\ \hat{\omega}_z & \hat{\omega}_y & -\hat{\omega}_x & 0 \end{bmatrix},$$

wherein angular velocity $\hat{w}_t$ is a three-dimensional vector, $\hat{\omega}_x$, $\hat{\omega}_y$ and $\hat{\omega}_z$ represent data of three direction axes respectively;

$$\|\ \|_{norm} = \frac{q}{\|q\|_2},$$

four-order Runge-Kutta pre-integration of velocity $V_t$ is:

$$V_t = V_{t-1} + \frac{1}{6}\Delta t(k_1^v + 2k_2^v + 2k_3^v + k_4^v),$$

$$\begin{cases} k_1^v = C\left(q_0 \otimes {}_{w}^{b_{t-1}}q\right)^T \hat{a}_t + {}^w g \\ k_2^v = C\left(q_0 \otimes \left\|q_0 + \frac{1}{2}k_1^q\Delta t\right\|_{norm}\right)^T \hat{a}_t + {}^w g \\ k_3^v = C\left(q_0 \otimes \left\|q_0 + \frac{1}{2}k_2^q\Delta t\right\|_{norm}\right)^T \hat{a}_t + {}^w g \\ k_4^v = C\left(q_0 \otimes \left\|q_0 + \frac{1}{2}k_3^q\Delta t\right\|_{norm}\right)^T \hat{a}_t + {}^w g \end{cases},$$

$$R = C(q) = (q_w^2 - q_v^T q_v) + 2q_v q_v^T + 2q_w[q_v]_x,$$

$$q = [q_w\ q_v^T]^T,$$

wherein $V_t$ is velocity at a current moment, $V_{t-1}$ is velocity at the moment t−1, and a C(q) function is a function converted from quaternion into a rotary matrix R;

a four-order Runge-Kutta pre-integration of relative displacement $_{b_{t-1}}^{b_t}p$ is:

$$_{b_{t-1}}^{b_t}p = \frac{1}{6}\Delta t(k_1^p + 2k_2^p + 2k_3^p + k_4^p),$$

wherein value ranges of $k_1^p$, $k_2^p$, $k_3^p$, $k_4^p$ are as follows:

$$\begin{cases} k_1^p = V_{t-1} \\ k_2^p = V_{t-1} + \frac{1}{2}k_1^p \Delta t \\ k_3^p = V_{t-1} + \frac{1}{2}k_2^p \Delta t \\ k_4^p = V_{t-1} + \frac{1}{2}k_3^p \Delta t \end{cases},$$

a four-order Runge-Kutta pre-integration of the angular velocimeter deviation $b_{g,t}$ is:

$b_{g,t}=b_{g,t-1}$, wherein $b_{g,t-1}$ is angular velocimeter deviation at the moment t−1;

a four-order Runge-Kutta pre-integration of the angular velocimeter deviation $b_{a,t}$ is:

$b_{a,t}=b_{a,t-1}$, wherein $b_{a,t-1}$ wherein is angular velocimeter deviation at the moment t−1;

$q=[q_w \; q_v^T]^T$ is a quaternion, $q_w$ represents a real part, $q_v$ represents a virtual part, $$\| \|_{norm} = \frac{q}{\|q\|_2}$$

plays a role of normalizing the quaternion, $^w g$ represents an earth acceleration at the current position, and $q_0$ represents a gesture at the moment t−1.

In an embodiment, the Step B specifically includes:

Step B1: acquiring radar point cloud data $^{L_i}P_t$ at the current moment t by laser radar, wherein P represents point cloud, and projecting the radar point cloud data $^{L_i}P_t$ to a pixel of a depth map with a resolution of 1800*16 correspondingly;

Step B2: carrying out ordering, depth value division, dimension reduction, linear fitting and ground point screening on the depth map to acquire ground points and marking the ground points;

Step B3: partitioning the point cloud in the depth map into clusters one by one by using a barrier quick partitioning algorithm based on the depth map; and Step B4: eliminating clusters with a point number smaller than 30, marking laser points of a same cluster as partitioning points, and eliminating the laser points outside the partitioning points and the ground points to obtain a processed depth map.

In an embodiment, the Step C specifically includes:

Step C1: partitioning the processed depth map into six sub depth maps with resolutions of 300*16 and acquiring curvatures of the laser points $^{L_i}p_j$ of the sub depth maps, wherein a curvature acquisition formula of the laser points $^{L_i}p_j$ is as follows:

$$C_j = \frac{1}{10^* \|r_j\|} \sum_{k \in S, k \neq j} (r_k - r_j),$$

wherein $r_k$ and $r_j$ represent depth values of pixel points in the sub depth maps, k and j are index values in the sub depth map, and S is a set of indexes of continuous ten laser points of a same line;

Step C2: obtaining edge points and plane points according to the curvatures of the laser points $^{L_i}p_j$;

selecting two partitioning points in each line in each sub depth map to form an edge feature point set, wherein the partitioning points forming the edge feature point set are two edge points with the maximum curvature in each line of the sub depth map; and selecting four plane points with the minimum curvature C in each line in each sub depth map to form a plane feature point set; and Step C3: converting coordinates of the laser radar into a coordinate system of the unmanned surface vehicle body by all the plane feature point set and the edge feature point set of the laser radar via an outer parameter $_{Li}^{b}T$, and forming a feature point set $^b F_t$ at the current moment, wherein the feature point set $^b F_t$ comprises the edge feature point set and the plane feature point set.

In an embodiment, the Step D specifically includes:

Step D1: carrying out gesture transformation on the feature point set $^b F_t$ in adjacent 25 key frames at the current moment to obtain a local feature point cloud map $^w M_t$, wherein the local feature point cloud map $^w M_t$ comprises a local edge feature point cloud map $^w M_t^e$ and a local plane feature point cloud map $^w M_t^p$;

$^w M_t^e = {}^w F_t^e \cup \ldots \cup {}^w F_{t-25}^e$, wherein $^w F_t^e$ is a feature point set of the local edge feature point cloud map; and $^w M_t^p = {}^w F_t^p \cup \ldots \cup {}^w F_{t-25}^p$, wherein $^w F_t^p$ is a feature point set of the local plane feature point cloud map;

Step D2: acquiring a gesture transformation matrix $_w^{b\hat{t}}\hat{T}$ of the local feature point cloud map by using pre-integration of four-order Runge-Kutta method;

Step D3: acquiring the feature point set $^b F_t^1$ of the local feature point cloud map $^w M_t$ and converting the $^b F_t^1$ from the coordinate system of the unmanned surface vessel into a navigation coordinate system;

Step D4: selecting three laser points $^w p_a^e$, $^w p_b^e$ and $^w p_c^e$ in the local edge feature point cloud map $^w M_t^e$ and constructing an edge feature residual function, an edge feature residual function formula of which is as follows:

$$r_{e,a} = \frac{|({}^w p_a^e - {}^w p_b^e) \times ({}^w p_a^e - {}^w p_c^e)|}{|{}^w p_b^e - {}^w p_c^e|};$$

selecting four laser points $^w p_a^p$, $^w p_b^p$, $^w p_c^p$ and $^w p_d^p$ in the local plane feature point cloud map $^w M_t^p$ and constructing a plane feature residual function, a plane feature residual function formula of which is as follows:

$$r_{p,a} = ({}^w p_a^p - {}^w p_b^p)^T \cdot \frac{({}^w p_b^p - {}^w p_c^p) \times ({}^w p_b^p - {}^w p_d^p)}{|({}^w p_b^p - {}^w p_c^p) \times ({}^w p_b^p - {}^w p_d^p)|};$$

and

Step D5: acquiring a cumulative sum of the edge residual function and the plane residual function, and constructing a nonlinear least square problem on the cumulative sum of the edge residual function and the plane residual function to acquire a relative gesture transformation matrix $_w^{bt}T$ of the current unmanned surface vessel, wherein a formula of the nonlinear least square problem is as follows:

$$\min_{_w^{bt}T} \left\{ \sum_{^w p_t^s, a \in {}^w F_t^s} \rho a(r_{e,a}) + \sum_{^w p_t^p, a \in {}^w F_t^p} \rho a(r_{p,a}) \right\},$$

wherein ρa ( ) represents a self-adaptive loss function corresponding to the $a^{th}$ residue and a function thereof being represented as:

$$\rho a(r) = \frac{|a-2|}{a}\left\{\left(\frac{r/c}{|a-2|}+1\right)^{a/2}-1\right\},$$

wherein a∈R is a parameter of change of a probability distribution along with residue, and meanwhile, the loss function may be self-adapted to calculate a weight of the residue along with different values a, wherein c is a proportionality coefficient, being greater than 0.

In an embodiment, the Step E specifically includes:

Step E1: acquiring a laser radar speedometer factor and an inertial measurement unit factor, wherein the inertial measurement unit factor is consistent with a predicted gesture of the unmanned surface vessel, the laser radar speedometer factor is consistent with the relative gesture transformation matrix, and constraining a factor map by using the laser radar speedometer factor and the inertial measurement unit factor, a formula of which is as follows:

$$p(X) \propto \phi(x_0, x_1 \ldots x_n) = \prod_{i,j} l_i(x_j),$$

wherein $l_i(x_j)$ is a negative logarithm of a factor, and i and j are natural numbers;

Step E2: acquiring longitude and latitude coordinates via a BeiDou Navigation Satellite System, then converting the longitude and latitude coordinates to the navigation coordinate system via the outer parameter, acquiring BeiDou satellite positioning information $^{BDS}P$ by BeiDou satellite navigation, and carrying out linear interpolation on the BeiDou satellite positioning information $^{BDS}P$ and adjacent two key frames to acquire a BeiDou satellite positioning factor;

a formula thereof is as follows: $^{BDS}p(t)=(1-t)*^{BDS}p_0-t*^{BDS}p_1$, t∈[0,1], wherein $^{BDS}p_0$ and $^{BDS}p_1$ represent two frame data needing interpolation;

Step E3: acquiring a covariance matrix of Beidou satellite positioning by data resolving of Beidou Satellite Positioning System, and judging whether the covariance matrix of Beidou satellite positioning is smaller than the relative gesture transformation matrix, if so, constraining the factor map according to the Beidou satellite positioning factor, a formula thereof being as follows:

$$\min_{^{bt}_{w}p}\|^{BDS}p_t - {^{bt}_w}R^T {^{bt}_w}p\|^2 BDS_{\Sigma t},$$

wherein $^{BDS}p_t$ is positioning information of Beidou satellite under the navigation coordinate system at the moment t; $^{bt}_wR^T$ and $^{bt}_wp$ are respectively rotation and translation of the unmanned surface vessel relative to the navigation coordinate system; and $BDS_{\Sigma t}$ is a covariance matrix of the Beidou satellite at the moment t;

Step E4: pre-integrating the Doppler velocimeter via a timestamp t of the key frame and a timestamp t−1 of adjacent key frame thereof to obtain a Doppler velocimeter factor, a formula thereof being as follows: $_{b_t}^{b_{t-1}}p=\int_{t-1}^{t}{'DVL_V}(t)dt$, wherein $DVL_V(t)dt$ represents velocity of the Doppler velocimeter at the moment t; the factor map is constrained according to the Doppler velocimeter, a formula thereof being as follows:

$$\min_{^{bt}_{w}p}\|^{bt}_wp - (^{bt-1}_wP^T - ^{bt-1}_wp)\|^2 DVL\sum_t,$$

wherein $_{DVL}\Sigma_t$ is a covariance matrix of the Doppler velocimeter at the moment t, $^{b_t}_wp$ represents translation of the unmanned surface vessel relative to the navigation coordinate system at the time t, $^{b_{t-1}}_wp$ represents translation of the unmanned surface vessel relative to the navigation coordinate system at the time t−1, and $^{b_{t-1}}_{b_t}p$ is relative translation of the unmanned surface vessel from the moment t−1 to the moment t;

Step E5: finding a priori key frame $x_a$ of the latest key frame $x_t$ in the factor map by using a Scan Contest algorithm, and constructing a local key frame feature point cloud map $^wM_a$, $^wM_a=\{^wF_{t-12} \cup \ldots \cup {^WF_{t+12}}\}$ under the navigation coordinate system around the priori key frame $x_a$ via the gesture transformation matrix; and Step E6: obtaining a relative gesture matrix $_{ba}^{bt}T$ between the feature point set $^wF_t$ of the latest key frame $x_t$ and a feature point cloud map $^wM_a$ of a local key frame, and adding a closed-loop factor to the factor map, a formula thereof being as follows:

$$\min_{^{bt}_{w}T}\|^{bt}_wT^{*bt}_{ba}T^{*bt}_wT\|^2{_{loop}\sum t}.$$

In an embodiment, the Step F specifically includes:

Step F1: carrying out linear interpolation and spherical interpolation calculation on the gesture of the unmanned surface vessel according to the timestamps, and removing moving distortions of the laser radar, a linear interpolation formula thereof being as follows: $^bp(t)=(1-t)*^bp_0*^bp_1$, t∈[0, 1], wherein $^bP_0$ and $^bP_1$ represent two frame position information needing interpolation;

a spherical linear interpolation formula thereof is as follows:

$$^bq(t) = {^bq_0}\frac{\sin[(1-t)\Delta\theta]}{\sin(\Delta\theta)} + {^bq_1}\frac{\sin(t^*\Delta\theta)}{\sin(\Delta\theta)},$$

wherein $^bq_0$ and $^bq_1$ represent two frame gesture information needing interpolation;

Step F2: using a VoxelGrid filter in a PCL open source library to carry out downsampling filtering on each sonar point cloud data; and Step F3: splicing the radar point cloud data and the sonar point cloud data according to the gesture of the unmanned surface vessel after interpolation by using a function in the PCL library, so as form a three-dimensional point cloud map.

The present invention has the beneficial effects that the present invention uses multiple laser radar to construct interframe constrain together and to form a laser inertial odometer together with the inertial measurement unit, so that a gesture transformation matrix between adjacent two frames can be calculated. The point cloud data of each laser radar can eliminate noises in the environment by means of pre-treatment such as point cloud partitioning and feature point extraction. Meanwhile, an unconstrained optimization function in the laser inertial odometer adopts the self-adaptive loss function to improve the robustness of the odometer, and finally, high precision local positioning is realized.

DETAILED DESCRIPTION

Detail description on the embodiments of the present invention is made, and examples of the embodiments are illustrated in the drawings, wherein same or similar marks from all the way refer to same or similar components or components with same or similar functions. The embodiments described with reference to the drawings below are exemplary, and are merely used for explaining the present invention and are not construed as limitation to the present invention.

In description of the present invention, it is to be understood that orientation or position relationships indicated by terms: 'central', 'longitudinal', 'transverse', 'length', 'width', 'thickness', 'upper', 'lower', 'left', 'right', 'vertical', 'horizontal', 'top', 'bottom', 'inner', 'outer', 'axial', 'peripheral' and the like are orientation or position relationships indicated by the drawings and are only to describe the present invention and simplify the description rather than indicates or implies that the indicated device or components must have specific orientations and are configured and operated in the specific orientations. Therefore, it cannot be construed as limitations to the present invention.

In addition, terms 'first' and 'second' are only used for a description purpose rather than being construed to indicate or imply relative importance or implicitly indicate the quantity of indicated technical features. Thus, features defining 'first' and 'second' can expressively or implicitly include one or more features. In the description of the present invention, unless otherwise specified, 'a plurality of' means two or more than two.

In the description of the present invention, it is to be noted that unless otherwise specified and defined, terms 'mounting', 'connecting' and 'connection' should be understood in a broad sense, for example, 'mounting', 'connecting', 'connection' and 'attaching' can be either fixed connection or detachable connection or integrated connection; can be either direct connection and can be either indirect connection via an intermediation or internal communication of two components. Those skilled in the art can understand specific meaning of the terms in the present invention under specific circumstances.

Figure 1:
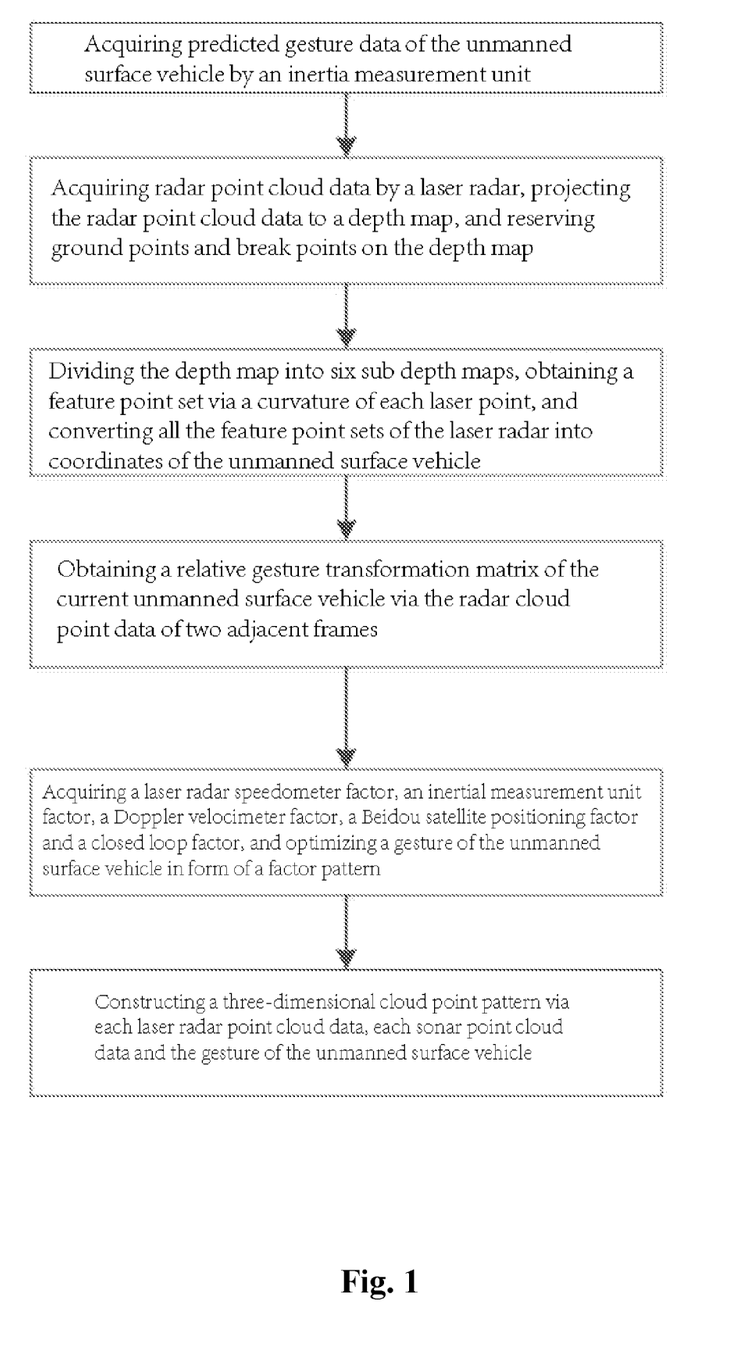
FIG. 1 is a flow diagram of an embodiment of the invention.
Figure 2:
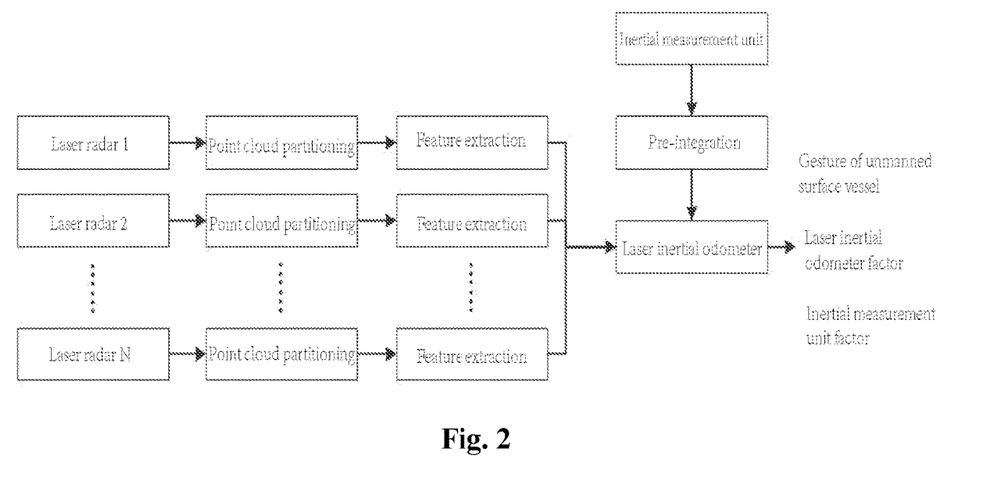
FIG. 2 is a flow diagram of acquiring a factor in an embodiment of the invention.
Figure 3:
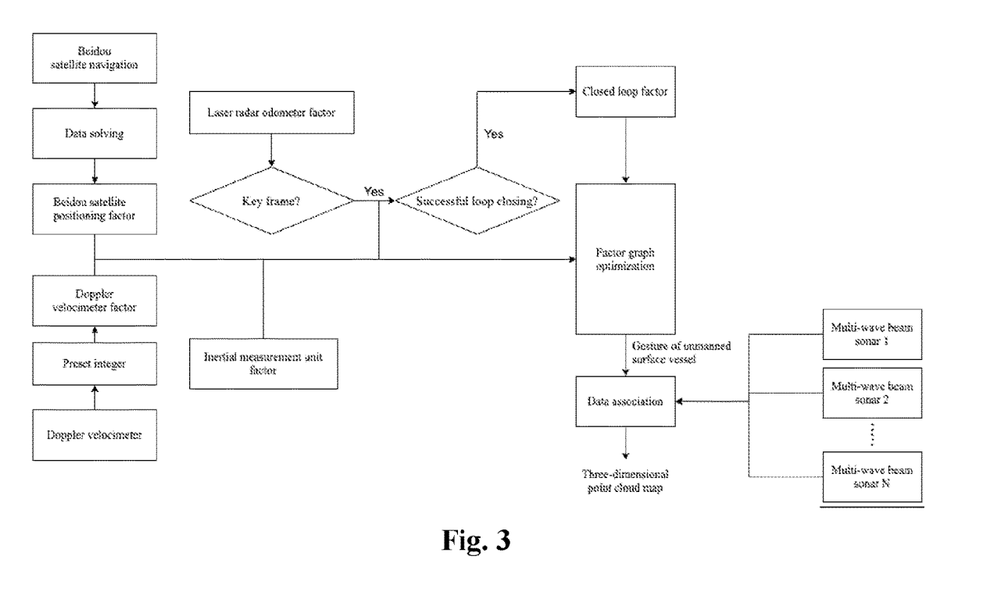
FIG. 3 is a flow diagram of a three-dimensional point cloud map of acquiring factor constraint in an embodiment of the present invention.

As shown in FIG. 1 to FIG. 3, a nearshore real-time positioning and mapping method for an unmanned surface vehicle with multiple distance measuring sensors includes the following steps:

Step A, predicted gesture data of the unmanned surface vehicle is acquired by an inertia measurement unit;

Step B, radar point cloud data is acquired by a laser radar, the radar point cloud data is projected to a depth map, and ground points and break points on the depth map are reserved;

Step C, the depth map is divided into six sub depth maps, a feature point set is obtained via a curvature of each laser point, and all the feature point sets of the laser radar are converted into coordinates of the unmanned surface vehicle;

Step D, a relative gesture transformation matrix of the current unmanned surface vehicle is obtained via the radar cloud point data of two adjacent frames;

Step E, a laser radar speedometer factor, an inertial measurement unit factor, a Doppler velocimeter factor, a Beidou satellite positioning factor and a closed loop factor are acquired, and a gesture of the unmanned surface vehicle is optimized in form of a factor pattern; and Step F, a three-dimensional cloud point pattern is constructed via each laser radar point cloud data, each sonar point cloud data and the gesture of the unmanned surface vehicle.

The present invention synchronizes timestamps among the plurality of sensors by way of linear interpolation and spherical interpolation, so that the problem that the combined state of each sensor cannot be estimated and mapping cannot be performed as a result of different clocks can be solved.

Secondarily, the present invention uses multiple laser radar to construct interframe constrain together and to form a laser inertial odometer together with the inertial measurement unit, so that a gesture transformation matrix between adjacent two frames can be calculated. The point cloud data of each laser radar can eliminate noises in the environment by means of pre-treatment such as point cloud partitioning and feature point extraction. Meanwhile, an unconstrained optimization function in the laser inertial odometer adopts the self-adaptive loss function to improve the robustness of the odometer, and finally, high precision local positioning is realized.

In addition, the latest unmanned surface vessel gesture obtained by the laser inertial odometer will be added into factor graph optimization and is jointly optimized together with the Beidou satellite positioning factor, the Doppler velocimeter factor and the closed loop factor. The closed loop factor can eliminate the accumulated error of the laser inertial odometer, so that centimetre-level global positioning of the unmanned surface vessel in the nearshore environment can be realized;

Finally, multiple laser radar and multiwave sonar can be used to construct land and underwater high-precision three-dimensional point cloud maps together, so that the unmanned surface vessel can be helped in functions of surveying and mapping, recognizing obstacles, navigating autonomously and the like.

In an embodiment, the Step A specifically includes:

a predicted gesture of the unmanned surface vehicle is obtained by the inertial measurement unit via four-order Runge-Kutta pre-integration according to an angular velocity $\hat{w}_t$ and an angular acceleration $\hat{a}_t$ at the current moment, wherein the predicted gesture of the unmanned surface vehicle comprises relative rotation $_{b_{t-1}}^{b_t}q$, relative displacement $_{b_{t-1}}^{b_t}p$, velocities $V_t$, angular velocimeter deviations $b_{g,t}$ and angular accelerometer deviations $b_{a,t}$ of a current frame and a previous frame;

a four-order Runge-Kutta pre-integration of relative rotation $_{b_{t-1}}^{b_t}q$ is:

$$_{b_{t-1}}^{b_t}q = q_0 + \frac{1}{6}\Delta t(k_1^q + 2k_2^q + 2k_3^q + k_4^q),$$

wherein value ranges of $k_1^q$, $k_2^q$, $k_3^q$, $k_4^q$ are as follows:

$$\begin{cases} k_1^q = \frac{1}{2}\Omega(\hat{\omega}_t)q_0 \\ k_2^q = \frac{1}{2}\Omega(\hat{\omega}_t)\left\|q_0 + \frac{1}{2}k_1^q\Delta t\right\|_{norm} \\ k_3^q = \frac{1}{2}\Omega(\hat{\omega}_t)\left\|q_0 + \frac{1}{2}k_2^q\Delta t\right\|_{norm} \\ k_4^q = \frac{1}{2}\Omega(\hat{\omega}_t)\|q_0 + k_3^q\Delta t\|_{norm} \end{cases}, \Omega(\hat{\omega}_t) = \begin{bmatrix} 0 & -\hat{\omega}_x & -\hat{\omega}_y & -\hat{\omega}_z \\ \hat{\omega}_x & 0 & \hat{\omega}_z & -\hat{\omega}_y \\ \hat{\omega}_y & -\hat{\omega}_z & 0 & \hat{\omega}_x \\ \hat{\omega}_z & \hat{\omega}_y & -\hat{\omega}_x & 0 \end{bmatrix},$$

wherein angular velocity $\hat{w}_t$ is a three-dimensional vector, $\hat{\omega}_x$, $\hat{\omega}_y$ and $\hat{\omega}_z$ represent data of three direction axes respectively;

$$\| \|_{norm} = \frac{q}{\|q\|_2},$$

a four-order Runge-Kutta pre-integration of velocity $V_t$ is:

$$V_t = V_{t-1} + \frac{1}{6}\Delta t(k_1^v + 2k_2^v + 2k_3^v + k_4^v),$$

$$\begin{cases} k_1^v = C\left(q_0 \otimes_w^{b_{t-1}} q\right)^T \hat{a}_t +^w g \\ k_2^v = C\left(q_0 \otimes \left\|q_0 + \frac{1}{2}k_1^q \Delta t\right\|_{norm}\right)^T \hat{a}_t +^w g \\ k_3^v = C\left(q_0 \otimes \left\|q_0 + \frac{1}{2}k_2^q \Delta t\right\|_{norm}\right)^T \hat{a}_t +^w g \\ k_4^v = C\left(q_0 \otimes \left\|q_0 + \frac{1}{2}k_3^q \Delta t\right\|_{norm}\right)^T \hat{a}_t +^w g \end{cases}$$

$$R = C(q) = (q_w^2 - q_v^T q_v) + 2q_v q_v^T + 2q_w[q_v]_\times,$$

$$q = [q_w \; q_v^T]^T,$$

wherein $V_t$ is velocity at a current moment, $V_{t-1}$ is velocity at the moment t−1, and a C(q) function is a function converted from quaternion into a rotary matrix R;

a four-order Runge-Kutta pre-integration of relative displacement $_{b_{t-1}}^{b_t}p$ is:

$$_{b_{t-1}}^{b_t}p = \frac{1}{6}\Delta t(k_1^p + 2k_2^p + 2k_3^p + k_4^p),$$

wherein value ranges of $k_1^p$, $k_2^p$, $k_3^p$, $k_4^p$ are as follows:

$$\begin{cases} k_1^p = V_{t-1} \\ k_2^p = V_{t-1} + \frac{1}{2}k_1^p \Delta t \\ k_3^p = V_{t-1} + \frac{1}{2}k_2^p \Delta t \\ k_4^p = V_{t-1} + \frac{1}{2}k_3^p \Delta t \end{cases}$$

a four-order Runge-Kutta pre-integration of the angular velocimeter deviation $b_{g,t}$ is:

$b_{g,t}=b_{g,t-1}$, wherein $b_{g,t-1}$ is angular velocimeter deviation at the moment t−1;

a four-order Runge-Kutta pre-integration of the angular velocimeter deviation $b_{a,t}$ is:

$b_{a,t}=b_{a,t-1}$ wherein $b_{a,t-1}$ is angular velocimeter deviation at the moment t−1;

$q=[q_w \; q_v^T]^T$ is a quaternion, $q_w$ represents a real part, $q_v$ represents a virtual part, $$\| \|_{norm} = \frac{q}{\|q\|_2}$$

plays a role of normalizing the quaternion, $^w g$ represents an earth acceleration at the current position, and $q_0$ represents a gesture at the moment t−1.

The inertial measurement unit is used to pre-integrate a predicted gesture of the unmanned surface vessel so as to improve the instantaneity of the algorithm. Meanwhile, constraint on position, gesture and speed of the unmanned surface vessel is provided for optimizing the later factor graph at the same time. As the inertial measurement unit is used for pre-integration, the output frequency of the laser radar odometer is increased from original 10 hz to 500 hz, and 500 hz high precision gesture output can substantially meet control over the unmanned surface vessel. At the same time, the pre-integration factor of the inertial measurement unit is added into the factor graph optimization, so that it is more accurate to estimate the gesture of the unmanned surface vessel, and the random wandering noise of the inertial measurement unit can further be measured. Therefore, the next pre-integration result is more accurate. Broadly speaking, the inertial measurement unit and the laser radar are tightly coupled to obtain the laser inertial odometer, and the factor graph optimization is a complementary process.

In an embodiment, the Step B specifically includes:

Step B1: radar point cloud data $^{L_i}P_t$ at the current moment t is acquired by the laser radar, wherein P represents point cloud, and projecting the radar point cloud data $^{L_i}P_t$ to a pixel of a depth map with a resolution of 1800*16 correspondingly;

Step B2: ordering, depth value division, dimension reduction, linear fitting and ground point screening are carried out on the depth map to acquire ground points and the ground points are marked;

Step B3: the point cloud in the depth map is partitioned into clusters one by one by using a barrier quick partitioning algorithm based on the depth map; and Step B4: clusters with a point number smaller than 30 are eliminated, laser points of a same cluster are marked as partitioning points, and the laser points outside the partitioning points and the ground points are eliminated to obtain a processed depth map.

The objective of the step is to remove noise of the laser radar sensors, so that gesture estimation of the unmanned surface vessel is of more robustness and stability. Clustering of fewer than 30 points is generally scanning of a small object by the laser radar, for example, leaves on a tree, flying birds and the like. Furthermore, the probability that the small object is noise is great, so that it is eliminated directly, and therefore, unnecessary operation is reduced.

In an embodiment, the Step C specifically includes:

Step C1: the processed depth map is partitioned into six sub depth maps with resolutions of 300*16 and curvatures of the laser points $^{L_i}p_j$ of the sub depth maps are acquired, wherein a curvature acquisition formula of the laser points $^{L_i}p_j$ is as follows:

$$C_j = \frac{1}{10^*\|r_j\|} \sum_{k \in S, k \neq j} (r_k - r_j),$$

wherein $r_k$ and $r_j$ represent depth values of pixel points in the sub depth maps, k and j are index values in the sub depth map, and S is a set of indexes of continuous ten laser points of a same line;

Step C2: edge points and plane points are obtained according to the curvatures of the laser points $^{L_i}p_j$;

two partitioning points in each line in each sub depth map are selected to form an edge feature point set, wherein the partitioning points forming the edge feature point set are two edge points with the maximum curvature in each line of the sub depth map; and four plane points with the minimum curvature C in each line in each sub depth map are selected to form a plane feature point set; and Step C3: coordinates of the laser radar are converted into a coordinate system of the unmanned surface vehicle body by all the plane feature point set and the edge feature point set of the laser radar via an outer parameter $_L{}^bT$, and forming a feature point set $^bF_t$ at the current moment, wherein the feature point set $^bF_t$ comprises the edge feature point set and the plane feature point set.

A judging threshold value will be introduced into judgment of curvatures of the laser points $^{Li}p_j$. When $C_j$ is smaller than the judging threshold value, the laser points $^{Li}p_j$ are edge points. On the contrary, when $C_j$ is greater than the judging threshold value, the laser points $^{Li}p_j$ are plane points. Each frame of data of a common 16-line laser radar has 16-1800 points. The operation amount is great to construct point-line constraint or point-plane constraint for each point. By extracting representative feature points in the radar point cloud data and constructing constraint for the feature points only, the operation amount of the unconstrained optimization problem is decreased greatly, and meanwhile, the robustness can be further improved. Compared with calculation for all the laser points, the method based on the feature points improves the operating times for 13 times, which meets the demands on instantaneity and lightweight.

In an embodiment, the Step D specifically includes:

Step D1: gesture transformation is carried out on the feature point set $^bF_t$ in adjacent 25 key frames at the current moment to obtain a local feature point cloud map $^wM_t$, wherein the local feature point cloud map $^wM_t$ comprises a local edge feature point cloud map $^wM_t^e$ and a local plane feature point cloud map $^wM_t^p$;

$^wM_t^e = {}^wF_t^e \cup \ldots \cup {}^wF_{t-25}^e$, wherein $^wF_t^e$ is a feature point set of the local edge feature point cloud map; and $^wM_t^p = {}^wF_t^p \cup \ldots \cup {}^wF_{t-25}^p$, wherein $^wF_t^p$ is a feature point set of the local plane feature point cloud map;

Step D2: a gesture transformation matrix $_w^{bt}\hat{T}$ of the local feature point cloud map by using pre-integration of four-order Runge-Kutta method;

Step D3: the feature point set $^bF_t^1$ of the local feature point cloud map $^wM_t$ is acquired and the $^bF_t^1$ is converted from the coordinate system of the unmanned surface vessel into a navigation coordinate system;

Step D4: three laser points $^wp_a^e$, $^wp_b^e$ and $^wp_c^e$ are selected in the local edge feature point cloud map $^wM_t^e$ and an edge feature residual function is constructed, an edge feature residual function formula of which is as follows:

$$r_{e,a} = \frac{|({}^wp_a^e - {}^wp_b^e) \times ({}^wp_b^e - {}^wp_c^e)|}{|{}^wp_b^e - {}^wp_c^e|};$$

four laser points $^wp_a^p$, $^wp_b^p$, $^wp_c^p$ and $^wp_d^p$ are selected in the local plane feature point cloud map $^wM_t^p$ and a plane feature residual function is constructed, a plane feature residual function formula of which is as follows:

$$r_{p,a} = ({}^wp_a^p - {}^wp_b^p)^T \cdot \frac{({}^wp_b^p - {}^wp_c^p) \times ({}^wp_b^p - {}^wp_d^p)}{|({}^wp_b^p - {}^wp_c^p) \times ({}^wp_b^p - {}^wp_d^p)|};$$

Step D5: a cumulative sum of the edge residual function and the plane residual function is acquired, and the nonlinear least square problem on the cumulative sum of the edge residual function and the plane residual function is constructed to acquire a relative gesture transformation matrix $_w^{bt}T$ of the current unmanned surface vessel, wherein a formula of the nonlinear least square problem is as follows:

$$\min_{_w^{bt}T}\left\{\sum_{{}^wp_t^e, a \in {}^wF_t^e} \rho a(r_{e,a}) + \sum_{{}^wp_t^p, a \in {}^wF_t^p} \rho a(r_{p,a})\right\},$$

wherein $\rho a(\ )$ represents a self-adaptive loss function corresponding to the $a^{th}$ residue and a function thereof being represented as:

$$\rho a(r) = \frac{|a-2|}{a}\left\{\left(\frac{r/c}{|a-2|}+1\right)^{a/2}-1\right\},$$

wherein $a \in R$ is a parameter of change of a probability distribution along with residue, and meanwhile, the loss function may be self-adapted to calculate a weight of the residue along with different values a, wherein c is a proportionality coefficient, being greater than 0.

The laser inertial odometer uses the self-adaptive loss function to reduce influence in solving unconstrained optimization problem by mismatch of the feature points or outlier measurement of sensors. Therefore, the unmanned surface vessel can further be position with high precision under a complex water domain environment, and meanwhile, positioning of the unmanned surface vessel in an external highly dynamic environment is not affected substantially.

In an embodiment, the Step E specifically includes:

Step E1: a laser radar speedometer factor and an inertial measurement unit factor are acquired, wherein the inertial measurement unit factor is consistent with a predicted gesture of the unmanned surface vessel, the laser radar speedometer factor is consistent with the relative gesture transformation matrix, and constraining a factor map by using the laser radar speedometer factor and the inertial measurement unit factor, a formula of which is as follows:

$$p(X) \propto \phi(x_0, x_1 \ldots x_n) = \prod_{i,j} l_i(x_j),$$

wherein $l_i(x_j)$ is a likelihood function in direct proportion to a Gaussian conditional probability density function, i,j is a natural number $X \in x_0, \ldots, x_n$, represents a set of states of the unmanned surface vessel, represents states of the unmanned surface vessel from moments 0-t, and P(X) is a joint probability density function of the states of the unmanned surface vessel subject to Gaussian distribution;

Step E2: longitude and latitude coordinates are acquired via a BeiDou Navigation Satellite System, then the longitude and latitude coordinates are converted into the navigation coordinate system via the outer parameter, BeiDou satellite positioning information $^{BDS}P$ is acquired by BeiDou satellite navigation, and linear interpolation on the BeiDou satellite positioning information $^{BDS}P$ and adjacent two key frames is carried out to acquire a BeiDou satellite positioning factor;

a formula thereof is as follows: $^{BDS}p(t)=(1-t)*{}^{BDS}p_0 - t*{}^{BDS}p_1$, $t \in [0,1]$ wherein $^{BDS}p_0$ and $^{BDS}p_1$ represent two frame data needing interpolation;

Step E3: a covariance matrix of Beidou satellite positioning is acquired by data resolving of Beidou Satellite Positioning System, and whether the covariance matrix of Beidou satellite positioning is smaller than the relative gesture transformation matrix or not is judged, if so, the factor map is constrained according to the Beidou satellite positioning factor, a formula thereof being as follows:

$$\min_{\substack{b_t \\ w p}} \|{}^{BDS}p_t - {}^{b_t}_w R^T {}^{b_t}_w p\|^2 BDS_{\Sigma t},$$

wherein ${}^{BDS}p_t$ is positioning information of Beidou satellite under the navigation coordinate system at the moment t; ${}^{b_t}_w R^T$ and ${}^{b_t}_w p$ are respectively rotation and translation of the unmanned surface vessel relative to the navigation coordinate system; and $BDS_{\Sigma t}$ is a covariance matrix of the Beidou satellite at the moment t;

Step E4: the Doppler velocimeter is pre-integrated via a timestamp t of the key frame and a timestamp t−1 of adjacent key frame thereof to obtain a Doppler velocimeter factor, a formula thereof being as follows: ${}^{bt-1}_{bt}p = \int_{t-1}^{t} DVL_V(t)dt$, wherein $DVL_V(t)dt$ represents velocity of the Doppler velocimeter at the moment t; the factor map is constrained according to the Doppler velocimeter, a formula thereof being as follows:

$$\min_{\substack{bt \\ w p}} \|{}^{bt}_w p - ({}^{bt-1}_w p^T - {}^{bt-1}_w p)\|^2 DVL\sum_t;$$

wherein $_{DVL}\Sigma_t$ is a covariance matrix of the Doppler velocimeter at the moment t, ${}^{b_t}_w p$ represents translation of the unmanned surface vessel relative to the navigation coordinate system at the time t, ${}^{b_{t-1}}_w p$ represents translation of the unmanned surface vessel relative to the navigation coordinate system at the time t−1, and ${}^{b_{t-1}}_{b_t} p$ is relative translation of the unmanned surface vessel from the moment t−1 to the moment t;

Step E5: a priori key frame $x_a$ of the latest key frame $x_t$ is found in the factor map by using a Scan Contest algorithm, and a local key frame feature point cloud map ${}^w M_a$, ${}^w M_a = \{{}^w F_{t-12} \cup \ldots \cup {}^W F_{t+12}\}$ under the navigation coordinate system around the priori key frame $x_a$ is constructed via the gesture transformation matrix; and Step E6: a relative gesture matrix ${}^{b_t}_{ba} T$ between the feature point set ${}^w F_t$ of the latest key frame $x_t$ and a feature point cloud map ${}^w M_a$ of a local key frame is obtained, and a closed-loop factor is added into the factor map, a formula thereof being as follows:

$$\min_{\substack{bt \\ w T}} \|{}^{bt}_w T^{T*bt}_{ba} T^{*bt}_w T\|^2_{loop} \sum t.$$

Factor graph optimization aims to perform loose coupling on information of the plurality of sensors. Each sensor has its advantages and disadvantages, for example, the Beidou positioning system can provide precise position information, but is affected by signal interference or has no signals; the inertial measurement unit can provide relatively accurate gesture information and is not interfered externally, and the position information is great in error. The laser inertial odometer can provide centimetre-level high precision positioning of a local area but cannot provide global positioning information, and has a gesture drifting condition under a large scene circumstance. Therefore, these sensor information is fused via the factor graph to make the best of the both worlds, thereby making full use of relatively accurate information of each sensor. At the same time, the closed loop factor is further added to compensate drift of the laser inertial odometer. Via the factor graph, even in a condition that a gps signal is poor, the algorithm also can provide global centimetre-level high precision positioning.

In an embodiment, the Step F specifically includes:

Step F1: linear interpolation and spherical interpolation calculation are carried out on the gesture of the unmanned surface vessel according to the timestamps, and moving distortions of the laser radar are removed, a linear interpolation formula thereof being as follows: ${}^b p(t)=(1-t)*{}^b p_0 *{}^b p_1$, t∈[0,1], wherein ${}^b P_0$ and ${}^b P_1$ represent two frame position information needing interpolation;

a spherical linear interpolation formula thereof is as follows:

$$^b q(t) = {}^b q_0 \frac{\sin[(1-t)\Delta\theta]}{\sin(\Delta\theta)} + {}^b q_1 \frac{\sin(t^*\Delta\theta)}{\sin(\Delta\theta)},$$

wherein ${}^b q_0$ and ${}^b q_1$ represent two frame gesture information needing interpolation;

Step F2: a VoxelGrid filter in a PCL open source library is used to carry out downsampling filtering on each sonar point cloud data; and Step F3: the radar point cloud data and the sonar point cloud data are spliced according to the gesture of the unmanned surface vessel after interpolation by using a function in the PCL library, so as to form a three-dimensional point cloud map.

In the description of the present specification, the description with reference to the terms "an embodiment", "some embodiments", "schematic embodiments", "example", "specific example", or "some examples" and the like means that specific features, structures, materials, or features described in connection with the embodiments or examples are included in at least one embodiment or example of the present disclosure. In the description, schematic expressions of the terms do not have to mean same embodiments or exemplary embodiments. Furthermore, specific features, structures, materials or characteristics described can be combined in any one or more embodiments or exemplary embodiments in proper manners.

Although the embodiments of the present invention have been shown and described, those skilled in the art can understand that various changes, modifications, substitutions, and alterations could be made hereto without departing from the spirit and purpose of the present invention. The scope of the present invention is limited by the claims and the equivalents hereof

What is claimed is:

1. A nearshore real-time positioning and mapping method for an unmanned surface vehicle with multiple distance measuring sensors, the method comprising the following steps:

Step A, acquiring predicted gesture data of the unmanned surface vehicle by an inertia measurement unit;

Step B, acquiring radar point cloud data by a laser radar, projecting the radar point cloud data to a depth map, and reserving ground points and break points on the depth map, wherein the break points are laser points of a same cluster;

Step C, dividing the depth map into six sub depth maps, obtaining a feature point set via a curvature of each laser point, and converting all the feature point sets of the laser radar into coordinates of the unmanned surface vehicle;

Step D, obtaining a relative gesture transformation matrix of the current unmanned surface vehicle via the radar cloud point data of two adjacent frames;

Step E, acquiring a laser radar speedometer factor, an inertial measurement unit factor, a Doppler velocimeter factor, a Beidou satellite positioning factor and a closed loop factor, and optimizing a gesture of the unmanned surface vehicle in form of a factor pattern; and Step F, constructing a three-dimensional cloud point pattern via each laser radar point cloud data, each sonar point cloud data and the gesture of the unmanned surface vehicle.

2. The nearshore real-time positioning and mapping method for an unmanned surface vehicle with multiple distance measuring sensors according to claim 1, wherein the Step A specifically comprises:

obtaining a predicted gesture of the unmanned surface vehicle by the inertial measurement unit via four-order Runge-Kutta pre-integration according to an angular velocity $\hat{\omega}_t$ and an angular acceleration $\hat{\alpha}_t$ at the current moment, wherein the predicted gesture of the unmanned surface vehicle comprises relative rotation $_{b_{t-1}}^{b_t}q$, relative displacement $_{b_{t-1}}^{b_t}p$, velocities $V_t$, angular velocimeter deviations $b_{g,t}$ and angular accelerometer deviations $b_{a,t}$ of a current frame and a previous frame;

a four-order Runge-Kutta pre-integration of relative rotation $_{b_{t-1}}^{b_t}q$ is:

$$_{b_{t-1}}^{b_t}q = q_0 + \frac{1}{6}\Delta t(k_1^q + 2k_2^q + 2k_3^q + k_4^q),$$

wherein value ranges of $k_1^q$, $k_2^q$, $k_3^q$, $k_4^q$ are as follows:

$$\begin{cases} k_1^q = \frac{1}{2}\Omega(\hat{\omega}_t)q_0 \\ k_2^q = \frac{1}{2}\Omega(\hat{\omega}_t)\left\|q_0 + \frac{1}{2}k_1^q\Delta t\right\|_{norm} \\ k_3^q = \frac{1}{2}\Omega(\hat{\omega}_t)\left\|q_0 + \frac{1}{2}k_2^q\Delta t\right\|_{norm} \\ k_4^q = \frac{1}{2}\Omega(\hat{\omega}_t)\|q_0 + k_3^q\Delta t\|_{norm} \end{cases}; \Omega(\hat{\omega}_t) = \begin{bmatrix} 0 & -\hat{\omega}_x & -\hat{\omega}_y & -\hat{\omega}_z \\ \hat{\omega}_x & 0 & \hat{\omega}_z & -\hat{\omega}_y \\ \hat{\omega}_y & -\hat{\omega}_z & 0 & \hat{\omega}_x \\ \hat{\omega}_z & \hat{\omega}_y & -\hat{\omega}_x & 0 \end{bmatrix},$$

wherein angular velocity $\hat{w}_t$ is a three-dimensional vector, $\hat{\omega}_x$, $\hat{\omega}_y$ and $\hat{\omega}_z$ represent data of three direction axes respectively;

$$\|\ \|_{norm} = \frac{q}{\|q\|_2},$$

a four-order Runge-Kutta pre-integration of velocity $V_t$ is:

$$V_t = V_{t-1} + \frac{1}{6}\Delta t(k_1^v + 2k_2^v + 2k_3^v + k_4^v),$$

$$\begin{cases} k_1^v = C\left(q_0 \otimes {}^{b_{t-1}}_w q\right)^T \hat{a}_t + {}^w g \\ k_2^v = C\left(q_0 \otimes \left\|q_0 + \frac{1}{2}k_1^q\Delta t\right\|_{norm}\right)^T \hat{a}_t + {}^w g \\ k_3^v = C\left(q_0 \otimes \left\|q_0 + \frac{1}{2}k_2^q\Delta t\right\|_{norm}\right)^T \hat{a}_t + {}^w g \\ k_4^v = C\left(q_0 \otimes \left\|q_0 + \frac{1}{2}k_3^q\Delta t\right\|_{norm}\right)^T \hat{a}_t + {}^w g \end{cases},$$

$$R = C(q) = (q_w^2 - q_v^T q_v) + 2q_v q_v^T + 2q_w[q_v]_x,$$

$$q = [q_w \ q_v^T]^T,$$

wherein $V_t$ is velocity at a current moment, $V_{t-1}$ is velocity at the moment t−1, and a C(q) function is a function converted from quaternion into a rotary matrix R;

a four-order Runge-Kutta pre-integration of relative displacement $_{b_{t-1}}^{b_t}p$ is:

$$_{b_{t-1}}^{b_t}p = \frac{1}{6}\Delta t(k_1^p + 2k_2^p + 2k_3^p + k_4^p),$$

wherein value ranges of $k_1^p$, $k_2^p$, $k_3^p$, $k_4^p$ are as follows:

$$\begin{cases} k_1^p = V_{t-1} \\ k_2^p = V_{t-1} + \frac{1}{2}k_1^p\Delta t \\ k_3^p = V_{t-1} + \frac{1}{2}k_2^p\Delta t \\ k_4^p = V_{t-1} + \frac{1}{2}k_3^p\Delta t \end{cases},$$

a four-order Runge-Kutta pre-integration of the angular velocimeter deviation $b_{g,t}$ is:

$b_{g,t}=b_{g,t-1}$, wherein $b_{g,t-1}$ is angular velocimeter deviation at the moment t−1;

a four-order Runge-Kutta pre-integration of the angular velocimeter deviation $b_{a,t}$ is:

$b_{a,t}=b_{a,t-1}$, wherein $b_{a,t-1}$ wherein is angular velocimeter deviation at the moment t−1;

$q=[q_w \ q_v^T]^T$ is a quaternion, $q_w$ represents a real part, $q_v$ represents a virtual part, $$\|\ \|_{norm} = \frac{q}{\|q\|_2}$$

plays a role of normalizing the quaternion, $^w g$ represents an earth acceleration at the current position, and go represents a gesture at the moment t−1.

3. The nearshore real-time positioning and mapping method for an unmanned surface vehicle with multiple distance measuring sensors according to claim 1, wherein the Step B specifically comprises:

Step B1: acquiring radar point cloud data $^{L_i}P_t$ at the current moment t by the laser radar, wherein P represents point cloud, and projecting the radar point cloud data $^{L_i}P_t$ to a pixel of a depth map with a resolution of 1800*16 correspondingly;

Step B2: carrying out ordering, depth value division, dimension reduction, linear fitting and ground point screening on the depth map to acquire ground points and marking the ground points;

Step B3: partitioning the point cloud in the depth map into clusters one by one by using a barrier quick partitioning algorithm based on the depth map; and Step B4: eliminating clusters with a point number smaller than 30, marking laser points of a same cluster as partitioning points, and eliminating the laser points outside the partitioning points and the ground points to obtain a processed depth map.

4. The nearshore real-time positioning and mapping method for an unmanned surface vehicle with multiple distance measuring sensors according to claim 3, wherein the Step C specifically comprises:

Step C1: partitioning the processed depth map into six sub depth maps with resolutions of 300*16 and acquiring curvatures of the laser points $^{L_i}p_j$ of the sub depth maps, wherein a curvature acquisition formula of the laser points $^{L_i}p_j$ is as follows:

$$C_j = \frac{1}{10 \cdot \|r_j\|} \sum_{k \in S, k \neq j} (r_k - r_j),$$

wherein $r_k$ and $r_j$ represent depth values of pixel points in the sub depth maps, k and j are index values in the sub depth map, and S is a set of indexes of continuous ten laser points of a same line;

Step C2: obtaining edge points and plane points according to the curvatures of the laser points $^{L_i}p_j$;

selecting two partitioning points in each line in each sub depth map to form an edge feature point set, wherein the partitioning points forming the edge feature point set are two edge points with the maximum curvature in each line of the sub depth map; and selecting four plane points with the minimum curvature C in each line in each sub depth map to form a plane feature point set; and Step C3: converting coordinates of the laser radar into a coordinate system of the unmanned surface vehicle body by all the plane feature point set and the edge feature point set of the laser radar via an outer parameter $_{L_i}^{b}T$, and forming a feature point set $^bF_t$ at the current moment, wherein the feature point set $^bF_t$ comprises the edge feature point set and the plane feature point set.

5. The nearshore real-time positioning and mapping method for an unmanned surface vehicle with multiple distance measuring sensors according to claim 4, wherein the Step D specifically comprises:

Step D1: carrying out gesture transformation on the feature point set $^bF_t$ in adjacent 25 key frames at the current moment to obtain a local feature point cloud map $^wM_t$, wherein the local feature point cloud map $^wM_t$ comprises a local edge feature point cloud map $^wM_t^e$ and a local plane feature point cloud map $^wM_t^p$;

$^wM_t^e = {}^wF_t^e \cup \ldots \cup {}^wF_{t-25}^e$, wherein $^wF_t^e$ is a feature point set of the local edge feature point cloud map; and $^wM_t^p = {}^wF_t^p \cup \ldots \cup {}^wF_{t-25}^p$, wherein $^wF_t^p$ is a feature point set of the local plane feature point cloud map;

Step D2: acquiring a gesture transformation matrix $_w^{bt}\hat{T}$ of the local feature point cloud map by using pre-integration of four-order Runge-Kutta method;

Step D3: acquiring the feature point set $^bF_t^1$ of the local feature point cloud map $^wM_t$ and converting the $^bF_t^1$ from the coordinate system of the unmanned surface vessel into a navigation coordinate system;

Step D4: selecting three laser points $^wp_a^e$, $^wp_b^e$ and $^wp_c^e$ in the local edge feature point cloud map $^wM_t^e$ and constructing an edge feature residual function, an edge feature residual function formula of which is as follows:

$$r_{e,a} = \frac{|(^wp_a^e - {}^wp_b^e) \times (^wp_b^e - {}^wp_c^e)|}{|{}^wp_b^e - {}^wp_c^e|};$$

selecting four laser points $^wp_a^p$, $^wp_b^p$, $^wp_c^p$ and $^wp_d^p$ in the local plane feature point cloud map $^wM_t^p$ and constructing a plane feature residual function, a plane feature residual function formula of which is as follows:

$$r_{p,a} = (^wp_a^p - {}^wp_b^p)^T \cdot \frac{(^wp_b^p - {}^wp_c^p) \times (^wp_b^p - {}^wp_d^p)}{|(^wp_b^p - {}^wp_c^p) \times (^wp_b^p - {}^wp_d^p)|};$$

and

Step D5: acquiring a cumulative sum of the edge residual function and the plane residual function, and constructing a nonlinear least square problem on the cumulative sum of the edge residual function and the plane residual function to acquire a relative gesture transformation matrix $_w^{bt}T$ of the current unmanned surface vessel, wherein a formula of the nonlinear least square problem is as follows:

$$\min_{_w^{bt}T} \left\{ \sum_{^wp_t^e, a \in {}^wF_t^e} \rho a(r_{e,a}) + \sum_{^wp_t^p, a \in {}^wF_t^p} \rho a(r_{p,a}) \right\},$$

wherein ρa ( ) represents a self-adaptive loss function corresponding to the ath residue and a function thereof being represented as:

$$\rho a(r) = \frac{|a-2|}{a} \left\{ \left( \frac{r/c}{|a-2|} + 1 \right)^{a/2} - 1 \right\},$$

wherein a∈R is a parameter of change of a probability distribution along with residue, and meanwhile, the loss function may be self-adapted to calculate a weight of the residue along with different values a, wherein c is a proportionality coefficient, being greater than 0.

6. The nearshore real-time positioning and mapping method for an unmanned surface vehicle with multiple distance measuring sensors according to claim 5, wherein the Step E specifically comprises:

Step E1: acquiring a laser radar speedometer factor and an inertial measurement unit factor, wherein the inertial measurement unit factor is consistent with a predicted gesture of the unmanned surface vessel, the laser radar speedometer factor is consistent with the relative gesture transformation matrix, and constraining a factor map by using the laser radar speedometer factor and the inertial measurement unit factor, a formula of which is as follows:

$$p(X) \propto \phi(x_0, x_1 \ldots x_n) = \prod_{i,j} l_i(x_j),$$

wherein $l_i(x_j)$ is a likelihood function in direct proportion to a Gaussian conditional probability density function, i,j is a natural number X∈$x_0$, ..., $x_n$ represents a set of states of the unmanned surface vessel, $x_0$, ..., $x_n$ represents states of the unmanned surface vessel from moments 0-t, and p(X) is a joint probability density function of the states of the unmanned surface vessel subject to Gaussian distribution;

Step E2: acquiring longitude and latitude coordinates via a BeiDou Navigation Satellite System, then converting the longitude and latitude coordinates to the navigation coordinate system via the outer parameter, acquiring BeiDou satellite positioning information $^{BDS}P$ by BeiDou satellite navigation, and carrying out linear interpolation on the BeiDou satellite positioning information $^{BDS}P$ and adjacent two key frames to acquire a BeiDou satellite positioning factor;

a formula thereof is as follows: $^{BDS}p(t)=(1-t)*{}^{BDS}p_0 - t*{}^{BDS}p_1$, t∈[0,1], wherein $^{BDS}p_0$ and $^{BDS}p_1$ represent two frame data needing interpolation;

Step E3: acquiring a covariance matrix of Beidou satellite positioning by data resolving of Beidou Satellite Positioning System, and judging whether the covariance matrix of Beidou satellite positioning is smaller than the relative gesture transformation matrix, if so, constraining the factor map according to the Beidou satellite positioning factor, a formula thereof being as follows:

$$\min_{{}^{bt}_{w}p} \|{}^{BDS}p_t - {}^{bt}_{w}R^T {}^{bt}_{w}p\|^2 BDS_{\Sigma_t},$$

wherein ${}^{BDS}p_t$ is positioning information of Beidou satellite under the navigation coordinate system at the moment t; ${}^{bt}_{w}R^T$ and ${}^{bt}_{w}p$ are respectively rotation and translation of the unmanned surface vessel relative to the navigation coordinate system; and $BDS_{\Sigma_t}$ is a covariance matrix of the Beidou satellite at the moment t;

Step E4: pre-integrating the Doppler velocimeter via a timestamp t of the key frame and a timestamp t−1 of adjacent key frame thereof to obtain a Doppler velocimeter factor, a formula thereof being as follows: ${}^{bt-1}_{bt}p = \int_{t-1}^{t} DVL_V(t)dt$, wherein $DVL_V(t)dt$ represents velocity of the Doppler velocimeter at the moment t; the factor map is constrained according to the Doppler velocimeter, a formula thereof being as follows:

$$\min_{{}^{bt}_{w}p} \|{}^{bt}_{w}p - ({}^{bt-1}_{w}P^T - {}^{bt-1}_{w}p)\|^2 DVL\sum_t,$$

wherein $_{DVL}\Sigma_t$ is a covariance matrix of the Doppler velocimeter at the moment t, ${}^{bt}_{w}p$ represents translation of the unmanned surface vessel relative to the navigation coordinate system at the time t, ${}^{bt-1}_{w}p$ represents translation of the unmanned surface vessel relative to the navigation coordinate system at the time t−1, and ${}^{bt-1}_{bt}p$ is relative translation of the unmanned surface vessel from the moment t−1 to the moment t;

Step E5: finding a priori key frame $x_a$ of the latest key frame $x_t$ in the factor map by using a Scan Contest algorithm, and constructing a local key frame feature point cloud map ${}^wM_a$, ${}^wM_a = \{{}^wF_{t-12} \cup \ldots \cup {}^WF_{t+12}\}$ under the navigation coordinate system around the priori key frame $x_a$ via the gesture transformation matrix; and Step E6: obtaining a relative gesture matrix ${}^{bt}_{ba}T$ between the feature point set ${}^wF_t$ of the latest key frame $x_t$ and a feature point cloud map ${}^wM_a$ of a local key frame, and adding a closed-loop factor to the factor map, a formula thereof being as follows:

$$\min_{{}^{bt}_{w}T} \|{}^{bt}_{w}T^{T*}{}^{bt}_{ba}T*{}^{bt}_{w}T\|^2 {}_{loop}\sum_t.$$

7. The nearshore real-time positioning and mapping method for an unmanned surface vehicle with multiple distance measuring sensors according to claim 1, wherein the Step F specifically comprises:

Step F1: carrying out linear interpolation and spherical interpolation calculation on the gesture of the unmanned surface vessel according to the timestamps, and removing moving distortions of the laser radar, a linear interpolation formula thereof being as follows: ${}^bp(t)=(1-t)*{}^bp_0*{}^bp_1$, t∈[0,1], wherein ${}^bP_0$ and ${}^bP_1$ represent two frame position information needing interpolation;

a spherical linear interpolation formula thereof is as follows:

$$^bq(t) = {}^bq_0 \frac{\sin[(1-t)\Delta\theta]}{\sin(\Delta\theta)} + {}^bq_1 \frac{\sin(t^*\Delta\theta)}{\sin(\Delta\theta)},$$

wherein ${}^bq_0$ and ${}^bq_1$ represent two frame gesture information needing interpolation;

Step F2: using a VoxelGrid filter in a PCL open source library to carry out downsampling filtering on each sonar point cloud data; and Step F3: splicing the radar point cloud data and the sonar point cloud data according to the gesture of the unmanned surface vessel after interpolation by using a function in the PCL library, so as form a three-dimensional point cloud map.

\* \* \* \* \*